United States Patent [19]

Pommier

[11] 4,282,917
[45] Aug. 11, 1981

[54] RADIAL CARCASS TIRE EMPLOYING CARCASS EXPANSION LIMITING BLOCK

[75] Inventor: Jean Pommier, Clermont-Ferrand, France

[73] Assignee: Compagnie Generale des Etablissements Michelin, Clermont-Ferrand, France

[21] Appl. No.: 117,039

[22] Filed: Jan. 30, 1980

Related U.S. Application Data

[63] Continuation-in-part of Ser. No. 44,478, Jun. 1, 1979, abandoned.

[30] Foreign Application Priority Data

Mar. 29, 1979 [FR] France ............................ 79 08176

[51] Int. Cl.³ .......................... B60C 9/08; B60C 9/20
[52] U.S. Cl. .......................... 152/352 R; 152/354 R; 152/359; 152/361 FP; 152/361 DM
[58] Field of Search ......... 152/354 R, 361 R, 361 FP, 152/361 DM, 352, 353, 359

[56] References Cited

U.S. PATENT DOCUMENTS

| | | | |
|---|---|---|---|
| 2,884,040 | 4/1959 | Boussu et al. | 152/361 |
| 3,018,814 | 1/1962 | Saint-Paul | 152/361 R |
| 3,515,197 | 6/1970 | Boileau | 152/361 FP |
| 4,016,916 | 4/1977 | Ravagnani | 152/354 X |

FOREIGN PATENT DOCUMENTS

| | | | |
|---|---|---|---|
| 1001585 | 2/1952 | France | 152/361 |
| 808824 | 2/1959 | United Kingdom | 152/361 |

*Primary Examiner*—John E. Kittle
*Assistant Examiner*—Lois E. Boland
*Attorney, Agent, or Firm*—Brumbaugh, Graves, Donohue & Raymond

[57] ABSTRACT

A tire with a radial carcass reinforcement and a tread reinforcement formed of at least two superimposed work plies of wires or cables is improved due to the fact that between the radial carcass reinforcement and the tread reinforcement there is arranged a limiting block of two superimposed plies whose axial width is between a maximum value $M_b = (-80\ H/B) + 100$ and a minimum value $m_b = (-48\ H/B) + 60$, these values being expressed in percentage of the overall maximum axial width B of the tire, H being the overall radial height of the tire on a rim.

11 Claims, 7 Drawing Figures

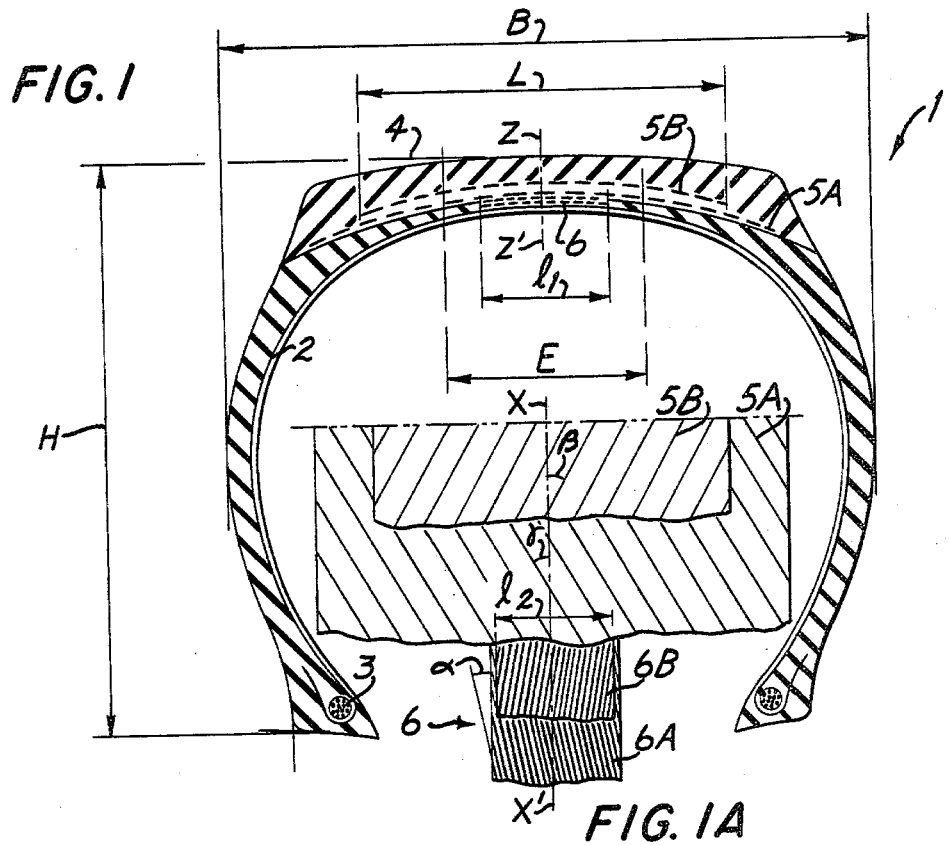
FIG. 1
FIG. 1A
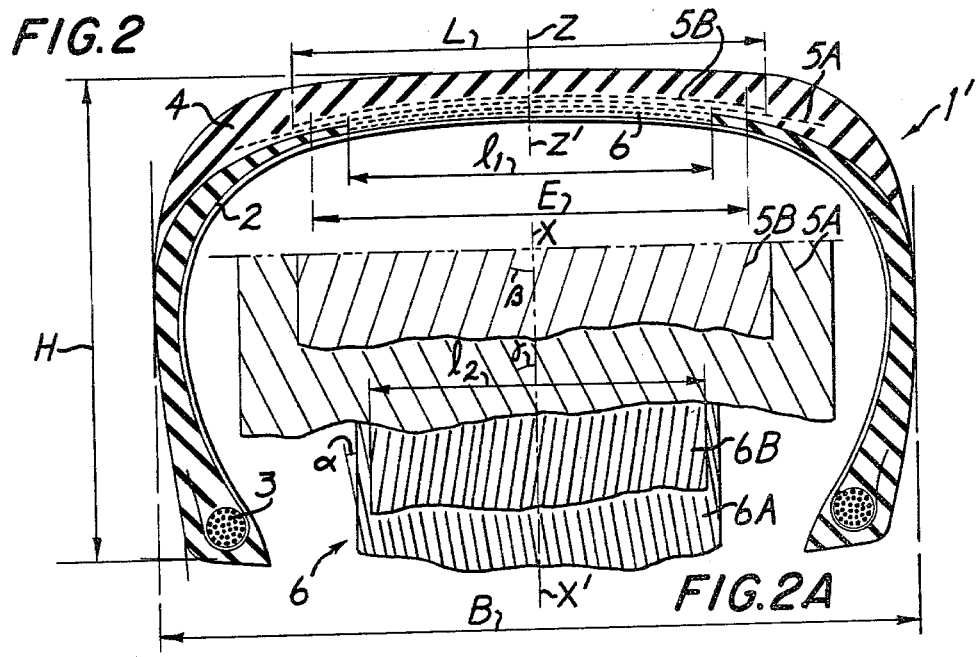
FIG. 2
FIG. 2A

RADIAL CARCASS TIRE EMPLOYING CARCASS EXPANSION LIMITING BLOCK

This application is a continuation-in-part application of U.S. application Ser. No. 44,478, filed June 1, 1979, now abandoned.

This invention relates to improvements in pneumatic road tires with a radial carcass reinforcement and a tread reinforcement formed of at least two superimposed work plies of wires or cables which are parallel in each ply, crossed from one ply to the other and form in each ply an acute angle of between 10° and 45° with the longitudinal direction of the tire, the tread reinforcement, seen in meridian cross section, being parallel to the radial carcass reinforcement along an equatorial zone (that is to say centered on the equatorial plane of the tire) and being arranged between the radial carcass reinforcement and the tread.

It is known that the invention of the radial carcass tire having a tread reinforcement, such as described fundamentally in French patent No. 1,001,585, has resulted in particular in a considerable increase in the resistance to wear of the tread of elastomer mix as compared with that of the tread of tires of the so-called bias carcass reinforcement type. The increase in this resistance to wear is attributed essentially to the fact that the structure of these tires produces a suitable separation between the functions of the sidewalls and of the tread and, therefore, an improved distribution of the pressures on the ground as well as a reduction of the relative movements of the surface of the tread upon the travel of the tire.

It is nevertheless noted that, even when conferring upon the tread reinforcement a meridian curvature which is less than that of the underlying radial carcass reinforcement, the edges of the tread reinforcement plies, in particular those known as the work plies, which are inclined between 10° and 45° with respect to the longitudinal direction of the tire and two of which are customarily present, tend to separate prematurely from each other. The splitting between the edges of the work plies is attributed to the heating and fatigue of the elastomer mix covering the wires or cables under the effect of the shear stresses caused by the travel of the tire. The splitting can appear prematurely as soon as the axial widths of the work plies exceed in practice a certain limit, which limit is definitely less than the axial distance between the edges of the tread. This premature appearance of splitting between the edges of the work plies has resulted in the failure of numerous proposals directed at widening the tread reinforcement in order to decrease the wear of the tread.

The applicant has discovered a means of increasing the width of the work plies beyond the above critical limit while delaying and even suppressing the appearance of splitting between the edges of these work plies. This means, unexpectedly, considerably increases the resistance to wear of the entire tread of tires of the type in question while avoiding the faster wear of the edges.

This means is characterized by the fact that it consists, on the one hand, in providing tires of the type in question, between the radial carcass reinforcement and the tread reinforcement in the equatorial zone along which the tread reinforcement is parallel to the radial carcass reinforcement, with a limiting block of two superimposed plies of wires or cables of low extensibility which are parallel to each other in each ply and crossed from one ply to the other forming with the longitudinal direction angles of opposite sign, each being both other than zero and less in absolute value than one-half of the smallest angle of the wires or cables of the work plies, the axial width of the limiting block being both between 60% and 100% of the axial width of the equatorial zone along which the tread reinforcement is parallel to the radial carcass reinforcement and between 12% and 20% of the overall maximum axial width B of the tire for a ratio H/B close to 1 and between 36% and 60% of the overall maximum axial width B of the tire for a ratio H/B close to 0.5, H being the overall radial height of the tire on a rim, and, on the other hand, in selecting the axial width of the narrowest work ply or the common axial width of the work plies of the tread reinforcement between 55% and 60% of the overall maximum axial width B of the tire for a ratio H/B close to 1 and between 70% and 85% of the overall maximum axial width B of the tire for a ratio H/B close to 0.5, H being the overall radial height of the tire on a rim.

The optimum axial width of the narrowest work ply or the common axial width of the work plies of the tread reinforcement is about 57% of the overall maximum axial width B of the tire for a ratio H/B close to 1 and is about 78% of the overall maximum axial width B of the tire for a ratio H/B close to 0.5, H being the overall radial height of the tire on a rim.

By wires or cables of low extensibility there are understood wires or cables, the relative elongation $\Delta l/l$ of which is less than 0.2% under a load equal to 10% of their rupture load. Wires or cables of steel are preferably employed, the multi-wire cables having a high cable lay of between 12 and 20 times the apparent diameter of the cable and the relative elongation of the cable being less than 0.2% under a load equal to 10% of the rupture load of the cable.

In order to provide for the transition between the edges of the two plies of the limiting block in accordance with the invention and the tread reinforcement and the radial carcass reinforcement, it is advantageous for one of the two plies of the limiting block to have edges which are slightly recessed with respect to those of the other ply, the difference in axial width being at most equal to 10% of the axial width of the wider ply of the limiting block. However, one can also form the limiting block by means of a single folded ply or two superimposed plies of the same width.

The limiting block of the two plies in accordance with the invention forms a block which limits the natural expansion of the subjacent radial carcass reinforcement under the effect of the inflation pressure. The limiting block in accordance with the invention, whose inside diameter is at most equal to the natural outside diameter of the radial carcass reinforcement, takes up the expansion stresses coming from the radial carcass reinforcement. The latter are therefore not transmitted to the tread reinforcement or to the tread itself. It seems that this state of affairs has a beneficial effect on the sector of the tire in contact with the ground, both with respect to the stresses between the edges of the work plies of the tread reinforcement and with respect to the causes of wear of the tread.

The improvement in the resistance to wear is between 10% and 25% as compared with radial tires of conventional structure.

As, in actual fact, no reinforcement wire or cable is unstretchable, the invention contemplates preferably arranging the wires or cables reinforcing the two plies of the limiting block at an angle in absolute value other than 0° with respect to the longitudinal direction of the tire. By thus crossing the plies, one can decrease or increase the meridian curvature of the limiting block under the effect of a radially inner pressure and therefore regulate the meridian profile of the radial carcass reinforcement when one decreases or increases the angle formed by the two plies. Preferably, the angle formed by the plies of the limiting block with the longitudinal direction of the tire is between 5° and 10°. In these plies the wires or cables are preferably adjoining.

The invention contemplates, in general, orienting the wires or cables of the two plies of the limiting block at angles which are less than one-half the smallest angle (or of the angle, when the work plies are oriented at equal but opposite angles) of the work plies with the longitudinal direction. The tension T, per unit of width measured in the axial direction, exerted on a ply of the limiting block by the radial carcass reinforcement can be evaluated in first approximation by the formula $T = p \cdot (R/2 \cos^2 \alpha)$. In this formula, p is the inflation pressure of the tire, R is the radius of the ply with respect to the axis of rotation of the tire and $\alpha$ is the angle of the wires or cables of the ply with the longitudinal direction of the tire. It results from this equation that the tension T of a ply of the limiting block is always less than the tension of the work ply having the smallest angle in the tread reinforcement. Therefore, the elongation of the limiting block under the effect of the tension coming from the radial carcass reinforcement is less than that of said work ply. One thus avoids the transmission of this tension of the tread reinforcement.

Various embodiments by way of example are shown in the accompanying drawing, which will be described hereinbelow.

FIG. 1 is a view in meridian or radial cross section of a tire according to the invention having a ratio H/B close to 1; to this view there is appended (FIG. 1A) a top plan view of the wire or cable plies essential for an understanding of the invention;

FIG. 2 is a view similar to FIG. 1 of a tire according to the invention having a ratio H/B close to 0.5; appended to this view there is a top plan view (FIG. 2A) of the wire or cable plies essential for an understanding of the invention;

Figure 4:
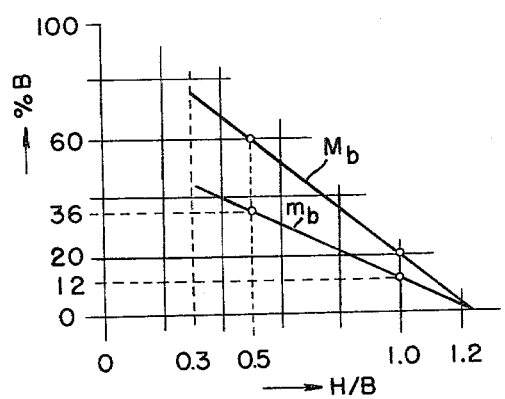
Figure 5:
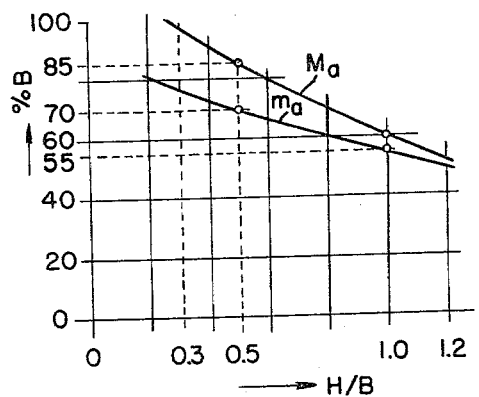

FIG. 4 is a graph which makes it possible to evaluate the limits of the axial width of the limiting block provided in accordance with the invention as a function of values of the ratio H/B of between 0.3 and 1.2; and FIG. 5 is a graph which makes it possible to evaluate the limits of the axial width of the narrowest work ply as a function of values of the ratio H/B of between 0.3 and 1.2.

In FIGS. 1, 1A, 2 and 2A, XX' designates the longitudinal direction, ZZ' the trace of the equatorial plane of the tire on the plane of the drawing, H the overall radial height of the tire on a rim, and B its overall maximum axial width, these two dimensions being measured in accordance with the customary standards.

Since the tire 1' of FIGS. 2, 2A differs from the tire 1 of FIGS. 1,1A only by its ratio H/B, the same reference numbers have been used for these two groups of figures.

In FIGS. 1A and 2A, the wires or cables of the plies of the tread reinforcement and those of the plies of the limiting block have been shown, for the sake of clarity, widely spaced apart from each other, while in reality they are very close to each other or even contiguous in the case of the wires or cables of the plies of the limiting block.

Each of the tires shown in FIGS. 1, 1A, 2, 2A has a radial carcass reinforcement 2, each of the ends of which is turned upwards around a bead ring 3, a tread 4, and its tread reinforcement composed of two work plies 5A, 5B, whose wires or cables form an acute angle $\gamma$ and $\beta$ of between about 10° and about 45° with the longitudinal direction XX' of the tire, these wires or cables being crossed from one ply to the other.

Between the radial carcass reinforcement 2 and the tread reinforcement 5A, 5B, in the equatorial zone E along which these two reinforcements are parallel to each other, there is arranged a limiting block 6 whose axial width $l_1$ is less than the axial width of the equatorial zone E. The limiting block 6 is formed of two plies 6A and 6B. The axial width $l_2$ of the ply 6B which is radially outwards of the ply 6A is less than the axial width $l_1$ of the ply 6A. The limiting block 6 is parallel to the radial carcass reinforcement 2 and centered on the equatorial plane of trace ZZ'.

In the top plan view (FIG. 1A) shown within the meridian or radial cross section of FIG. 1 it is seen that the angle $\alpha$ of the cables (of steel) of the plies 6A, 6B of the limiting block 6 is less than one-half of the angle $\beta$, $\beta$ being the smaller of the angles $\gamma$ and $\beta$ of the work plies 5A, 5B.

The work ply 5B which is radially to the outside of the work ply 5A has an axial width L which is less than the axial width of the work ply 5A. This axial width L is equal to 57% of the overall maximum axial width B of the tire.

Figure 3:
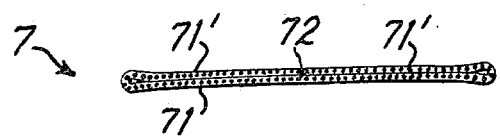
FIG. 3 is a view in meridian or radial cross section of a variant embodiment of the limiting block provided in accordance with the invention.

The limiting block 7 of FIG. 3 is formed of a ply 71 whose two edges have been folded radially outward to form two flaps 71', the total length of which is equal to that of the unfolded portion, so that the two flaps 71' meet at 72.

In FIG. 4, the line $M_b$ indicates the maximum axial width $l_1$ of the limiting block in accordance with the invention and the line $m_b$ the minimum axial width of the limiting block expressed in percentage of the overall maximum axial width B (ordinate) of the tire as a function of the ratio H/B (abscissa).

It is seen that the width of the limiting block decreases as the ratio H/B increases. For a ratio H/B greater than about 1.2 the limiting block is not needed, because the radial carcass reinforcement assumes its natural equilibrium profile over the entire extent of the crown and no longer tends to spread out radially. It is also seen that for H/B=1, $M_b=20\%$ and $m_b=12\%$, and that for H/B=0.5, $M_b=60\%$ and $m_b=36\%$.

In FIG. 5, the line $M_a$ indicates the maximum axial width L of the narrowest work ply 5B of the tread reinforcement in accordance with the invention and the line $m_a$ the minimum axial width of the same ply expressed in percentage of the overall maximum axial width B (ordinate) of the tire as a function of the ratio H/B (abscissa). It is seen that for H/B=1, $M_a=60\%$, $m_a=55\%$, and that for H/B=0.5, $M_a=85\%$ and $m_a=70\%$.

The curves of FIGS. 4 and 5 being practically linear, it can be assumed that for a ratio H/B of between 0.3 and 1.2, $M_b$ satisfies the relation $M_b=(-80\ H/B)+100$ and $m_b$ satisfies the relation $m_b=(-48\ H/B)+60$, and that $M_a$ satisfies the relation $M_a = (-50\ H/B) + 110$ and $m_a$ satisfies the relation $m_a = (-30\ H/B) + 85$.

The values of $M_b$, $m_b$, $M_a$ and $m_a$ are, of course, percentages of the overall maximum axial width B of the tire.

It is also useful to employ a limiting block 6 consisting of two crossed plies 6A and 6B, the wires or cables of which make different angle α in absolute value while remaining of opposite sign. The advantage of such asymmetrical arrangement is to correct, if necessary, lateral (axial) nonuniformity thrusts induced by the tread reinforcement 5A, 5B, or to prevent, especially in cases where a relatively wide limiting block 6 is used, the generation of such nonuniformity thrusts by the limiting block 6 itself. These thrusts may disturb the vehicle behavior and cause uneven wear of the tread 4.

In fact, a limiting block 6 formed by two symmetrically disposed plies 6A, 6B (e.g., at angles +α and −α) basically generate such harmful thrusts, because the two plies 6A, 6B are not located at the same distance from the axis of rotation of the tire 1 or 1'. Consequently, a limiting block 6 which does not generate lateral thrusts has its wires or cables disposed at asymmetrical angles α. By preference, the limiting block-ply 6A, the wires or cables of which are oriented at the greater angle α should be disposed radially inside the other ply 6B. A satisfactory angular arrangement is thus 8° for the radially inner ply 6A and 3° for the radially outer ply 6B.

For symmetrically disposed limiting block plies, the absolute value of the angle is preferably between 5° and 10°.

What is claimed is:

1. A tire with a radial carcass reinforcement anchored on both sides to at least one bead ring and with a tread reinforcement formed of at least two superimposed work plies of wires or cables which are parallel in each ply and crossed from one ply to the other forming acute angles of between 10° and 45° with the longitudinal direction of the tire, the tread reinforcement, seen in meridian cross section, being parallel to the radial carcass reinforcement along an equatorial zone and being arranged between the radial carcass reinforcement and the tread, characterized by the fact that between the radial carcass reinforcement and the tread reinforcement in the equatorial zone along which the tread reinforcement is parallel to the radial carcass reinforcement there is arranged a limiting block formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle of the wires or cables of the work plies, the axial width of the limiting block being both between 60% and 100% of the axial width of the equatorial zone along which the tread reinforcement is parallel to the radial carcass reinforcement and, for a ratio H/B of between 0.3 and 1.2, between a maximum value $M_b = (-80\ H/B) + 100$ and a minimum value $m_b = (-48\ H/B) + 60$ expressed in percentage of the overall maximum axial width B of the tire, and by the fact that for a ratio H/B of between 0.3 and 1.2, the axial width of the narrowest work ply or the common axial width of the work plies of the tread reinforcement is between a maximum value $M_a = (-50\ H/B) + 110$ and a minimum value $m_a = (-30\ H/B) + 85$ expressed in percentage of the overall maximum axial width B of the tire, H being the overall radial height of the tire on a rim and wherein the wires or cables of low extensibility of the limiting block have a relative elongation less than 0.2% under a load equal to 10% of their rupture load.

2. The tire according to claim 1, characterized by the fact that the opposite angles formed by the wires or cables of the two plies of the limiting block are asymmetrical with the longitudinal direction of the tire.

3. The tire according to claim 2, characterized by the fact that the wires or cables of the radially inner ply of the limiting block form a greater angle than that of the wires or cables of the radially outer ply of the limiting block.

4. The tire according to claim 3, characterized by the fact that the angle of the wires or cables of the radially inner ply is 8° and the angle of the wires or cables of the radially outer ply is 3° in absolute value.

5. The tire accordint to claim 1, characterized by the fact that the opposite angles formed by the wires or cables of the two plies of the limiting block are symmetrical with the longitudinal direction of the tire.

6. The tire according to claim 5, characterized by the fact that the opposite symmetrical angles formed by the wires or cables of the two plies of the limiting block are between 5° and 10° in absolute value.

7. The tire according to claim 2 or claim 5, characterized by the fact that the axial width of the limiting block is between 12% and 20% of the overall maximum axial width B of the tire for a ratio H/B close to 1 and between 36% and 60% of the overall maximum axial width B of the tire for a ratio H/B close to 0.5, and by the fact that the axial width of the narrowest work ply or the common axial width of the work plies of the tread reinforcement is between 55% and 60% of the overall maximum axial width B of the tire for a ratio H/B close to 1 and between 70% and 85% of the overall maximum axial width B of the tire for a ratio H/B close to 0.5, H being the overall radial height of the tire on a rim.

8. The tire according to claim 2 or claim 5, characterized by the fact that the axial width of the narrowest work ply or the common axial width of the work plies of the tread reinforcement is about 57% of the overall maximum axial width B of the tire for a ratio H/B close to 1 and is about 78% of the overall maximum axial width B of the tire for a ratio H/B close to 0.5, H being the overall radial height of the tire on a rim.

9. The tire according to claim 2 or claim 5, characterized by the fact that the two superimposed plies of the limiting block consist of cables of steel wires, the cable lay of which is between 12 and 20 times the apparent diameter of the cable.

10. The tire according to claim 2 or claim 5, characterized by the fact that the axial widths of the two superimposed plies of the limiting block differ by at most 10% from the axial width of the wider ply of the limiting block.

11. The tire according to claim 5, characterized by the fact that the limiting block is formed of a single folded ply.

* * * * *